(No Model.)
C. F. BRUSH.
SECONDARY OR STORAGE BATTERY ELEMENTS.
No. 266,089.
Patented Oct. 17, 1882.
*Fig. 1.*
Supporting body or core
Active coating consisting of a mass composed of a mixture of metallic lead and oxide of lead united by pressure
*Fig. 2.* *Fig. 3.*
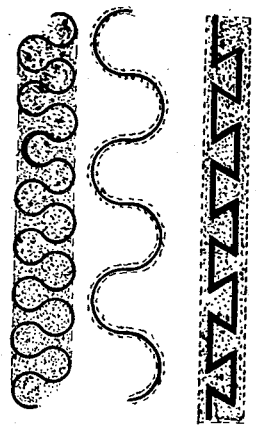
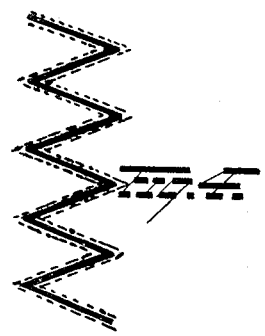
*Fig. 4.*
*Fig. 5.*
*Fig. 6.*
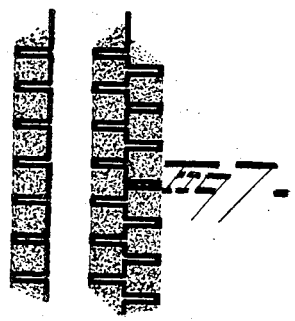
*Fig. 7.*
*Fig. 8.*
*Fig. 9.*
WITNESSES
E. J. Nottingham
Geo. W. Seymour
INVENTOR
Charles F. Brush
By Leggett & Leggett
Attorneys

UNITED STATES PATENT OFFICE.

CHARLES F. BRUSH, OF CLEVELAND, OHIO.

SECONDARY OR STORAGE BATTERY ELEMENT.

SPECIFICATION forming part of Letters Patent No. 266,089, dated October 17, 1882.

Application filed May 27, 1882. (No model.)

*To all whom it may concern:*

Be it known that I, CHARLES F. BRUSH, of Cleveland, in the county of Cuyahoga and State of Ohio, have invented certain new and useful Improvements in Secondary or Storage Battery Elements; and I do hereby declare the following to be a full, clear, and exact description of the invention, such as will enable others skilled in the art to which it pertains to make and use the same.

My invention relates to the elements of secondary or storage electric batteries; and said invention consists in a peculiar construction whereby an element shall consist of a sustaining body or core of pure lead, (or, if preferred, any alloy of lead and platinum, or any other suitable material,) upon one or more or all sides of which core is welded, or in any equivalent manner attached, a substance or mass, said mass consisting either of small particles of lead having oxidized surfaces welded by pressure into a compact and firmly-coherent body, or else of a mechanical mixture of non-oxidized lead particles and oxide of lead welded by pressure into a compact and firmly-coherent body.

It is a known fact that if particles of pure lead are collected and subjected to very heavy pressure, they will be perfectly welded into a single solid body, which, upon the closest inspection, will have every appearance of having been cast or rolled, all evidence of the former particles having entirely disappeared. Now, if the surfaces of these lead particles are oxidized, (either spontaneously by exposure to the air or by any suitable oxidizing process or application,) so that each of them are enveloped by a coating or film of oxide of lead, and then collected and subjected to this welding pressure, a firmly-coherent mass will be produced, consisting of pure lead with minute veins, sheets or membranes of lead oxide ramifying and extending throughout all parts of it in every direction. When the particles of oxidized lead above referred to are undergoing welding pressure, as described, their consequent change of form results in rupturing the enveloping coating of oxide of lead, so that a portion of the pure lead of the particles is exposed to the pure lead of neighboring particles, and at these points a weld is obtained, so that the entire mass is made strong and firmly coherent.

One method of making a secondary-battery element according to my invention is to cover one or more or all of the sides of a supporting body or core of any suitable material—say of lead—with particles of lead having their surfaces oxidized, as already specified, and then apply heavy pressure, sufficient not only to unite the oxidized particles into a firm mass, but also to unite the mass to its supporting body or core. To assist and insure the adhesion of the active coating the supporting-body may be suitably perforated, slotted, scored, or roughened, or the supporting-core may be corrugated or embossed. A few of an indefinite variety of methods and styles in which the supporting-body can be prepared are illustrated in the drawings.

Figure 1 shows an edge view of a plain plate or strip covered on one side only with the active coating. Fig. 2 shows the same with the active coating applied to both sides of the supporting-body. Fig. 3 illustrates three different styles of corrugations, and Fig. 4 another style of corrugation for the supporting-body. Fig. 5 is a section view, showing the supporting-body perforated or slotted. Fig. 6 is a section of a file-face body. Fig. 7 illustrates two methods of bending or folding the supporting-body, so as to form ribs or shelves for the retention of the active coating. Fig. 8 shows a grooved body, and Fig. 9 shows a perforated and corrugated body. In each of the above figures the active coating is represented by the dotted or stippled work.

Another method of making a secondary-battery element according to my invention may be mentioned. If particles of metallic lead be thoroughly mixed with oxide of lead in proportions of an equal bulk, or otherwise, of each, and this mixture subjected to the welding pressure already spoken of, the lead particles will, where they are in contact with each other, be welded together, and the oxide of lead will be retained among them, thus forming a mass consisting of lead, throughout which extends veins of lead oxide. Now, if a supporting core or body of lead, or any other suitable material, is covered with this mixture of metallic lead particles and lead oxide and heavy pressure applied, the mixture will not only be united into a strong and firmly-coherent mass, but the mass will be united to its supporting body or core.

I do not in any manner or degree limit myself to any shape, size, or particular description of the core or body which is to be coated with the mass of lead and lead oxide, as specified. It may be in the form of a sheet, bar, rod, string, or otherwise, no matter what.

For the sake of convenience in identifying this invention among others that I have made relating to the class of secondary batteries, I have denominated it as "Case N."

What I claim is—

A secondary-battery element consisting of a support or body having a coating attached thereto, said coating primarily composed of divided metallic lead and lead oxide united together into a firm and coherent mass, substantially as set forth.

In testimony whereof I have signed my name to this specification in the presence of two subscribing witnesses.

CHARLES F. BRUSH.

Witnesses:
 LEVERETT L. LEGGETT,
 ELBERT H. BAKER.